US010260816B2

(12) United States Patent
Calton

(10) Patent No.: US 10,260,816 B2
(45) Date of Patent: Apr. 16, 2019

(54) COMPACT HEAT EXCHANGE SYSTEM AND METHOD OF COOLING

(71) Applicant: E-Polytech Mfg. Sys, LLC, LaVernia, TX (US)

(72) Inventor: Dean Calton, LaVernia, TX (US)

(73) Assignee: E-POLYTECH MFG. SYS, LLC, Lavernia, TX (US)

( * ) Notice: Subject to any disclaimer, the term of this patent is extended or adjusted under 35 U.S.C. 154(b) by 1 day.

(21) Appl. No.: 15/514,523

(22) PCT Filed: Oct. 1, 2015

(86) PCT No.: PCT/US2015/053602
§ 371 (c)(1),
(2) Date: Mar. 26, 2017

(87) PCT Pub. No.: WO2016/054444
PCT Pub. Date: Apr. 7, 2016

(65) Prior Publication Data
US 2017/0227292 A1    Aug. 10, 2017

Related U.S. Application Data

(60) Provisional application No. 62/194,558, filed on Jul. 20, 2015, provisional application No. 62/064,609, (Continued)

(51) Int. Cl.
*F28D 5/02* (2006.01)
*F28B 1/06* (2006.01)
(Continued)

(52) U.S. Cl.
CPC ................ *F28D 5/02* (2013.01); *F28B 1/06* (2013.01); *F28B 9/06* (2013.01); *F28C 1/14* (2013.01);
(Continued)

(58) Field of Classification Search
CPC .......... F28D 5/02; F28D 1/0472; F28D 1/047; F28B 1/02; F28B 1/06; F28B 9/06;
(Continued)

(56) References Cited

U.S. PATENT DOCUMENTS 2,890,864 A * 6/1959 Stutz .......................... F28D 5/02
261/DIG. 11
3,212,288 A * 10/1965 Herbert .................... F24F 13/22
165/135
(Continued)

FOREIGN PATENT DOCUMENTS

EP         0054720 A1 *  6/1982  ................ F24F 6/04

*Primary Examiner* — Justin M Jonaitis
(74) *Attorney, Agent, or Firm* — Riddle Patent Law, LLC; Charles L. Riddle

(57) ABSTRACT

A heat exchange system comprises vertical centermost plenum surrounded by the heat exchange coil and housed in a plurality of side panels and a base, the plurality of side panels have air intakes that communicate outside air into the cabinet above the heat exchange coil and sprayers, a stream of spray water and air is drawn downwardly over a heat exchange coil, a portion of the spray water is separated from the air by drawing the air inward to the plenum, the air is then drawn upwardly within the plenum to an exhaust external to the enclosure.

17 Claims, 15 Drawing Sheets

Related U.S. Application Data filed on Oct. 16, 2014, provisional application No. 62/058,174, filed on Oct. 1, 2014.

(51) Int. Cl.
| | |
|---|---|
| *F28D 1/047* | (2006.01) |
| *F28D 1/02* | (2006.01) |
| *F28F 25/04* | (2006.01) |
| *F28F 25/06* | (2006.01) |
| *F28F 25/12* | (2006.01) |
| *F28B 9/06* | (2006.01) |
| *F28C 1/14* | (2006.01) |
| *F28C 1/16* | (2006.01) |

(52) U.S. Cl.
CPC ............... *F28C 1/16* (2013.01); *F28D 1/02* (2013.01); *F28D 1/0472* (2013.01); *F28F 25/04* (2013.01); *F28F 25/06* (2013.01); *F28F 25/12* (2013.01)

(58) Field of Classification Search
CPC .... F28B 39/04; F28C 1/14; F28C 1/16; F28F 25/04; F28F 25/06; F28F 25/12; F24F 3/044

USPC ....... 261/109, 96, 102, 105; 62/311; 454/42, 454/341; 165/117, 104.21, 104.13, 122, 165/178, 900, 59, 60, 90, 121, 48.1, 53, 165/168, 169; 137/561 R

See application file for complete search history.

(56) References Cited

U.S. PATENT DOCUMENTS

| | | | | |
|---|---|---|---|---|
| 3,437,319 | A * | 4/1969 | Bradley, Jr. | F28C 1/02 |
| | | | | 261/109 |
| 3,442,492 | A * | 5/1969 | Sullivan | F03D 3/067 |
| | | | | 416/118 |
| 3,677,029 | A * | 7/1972 | Schaeffer | F28B 5/00 |
| | | | | 62/305 |
| 3,903,213 | A * | 9/1975 | Stover | F28C 1/02 |
| | | | | 165/122 |
| 3,907,942 | A * | 9/1975 | Bradley, Jr. | B01D 1/16 |
| | | | | 165/120 |
| 6,942,200 | B2 * | 9/2005 | Gu | F28C 1/04 |
| | | | | 165/122 |
| 2005/0039892 | A1 * | 2/2005 | Calton | F28D 1/0472 |
| | | | | 165/122 |

* cited by examiner

COMPACT HEAT EXCHANGE SYSTEM AND METHOD OF COOLING

CROSS REFERENCE TO RELATED APPLICATIONS

This application is a national stage Section 371 continuation of and claims priority to PCT/US15/53602, filed Oct. 1, 2015, which claims priority to U.S. Provisional Patent Application No. 62/058,174, filed Oct. 1, 2014; U.S. Provisional Patent Application No. 62/064,609 filed on Oct. 16, 2014, and U.S. Provisional Patent Application No. 62/194,558 filed on Jul. 20, 2015; and incorporates the same by reference as if set forth herein in its entirety.

STATEMENT AS TO FEDERALLY SPONSORED RESEARCH

Not applicable.

BACKGROUND OF INVENTION a. Field of Invention

The invention relates generally to the field of process fluid cooling. More particularly, the invention refers to heat exchange systems and methods for cooling fluids using a compact cabinet using less space, height, and weight than other heat exchange systems known in the art.

Current State of the Art

In a traditional counter flow closed circuit fluid cooler, the air comes into the cabinet through inlet louvers located below the heat exchanger. The air is drawn up first through the heat exchanger, then the water spray, and finally across mist eliminators before being discharged through the fans.

Because the inlet air louvers are located below the heat exchanger coil and in the wet air stream, it is possible for water to splash out, or during windy periods to be blown out. This arrangement also requires more unit height to stack all of the areas one over the other.

U.S. Pat. No. 5,501,269 to Jenkens discloses a condenser unit configuration having double wall sidewalls wherein outside air is drawn into the cabinet above the sprayers. This configuration does prevent sunlight reaching the sump water as well as sump water splashing out the inlet louvers by using the double side walls to bring in the outside air through inlets near the top of the walls. Air enters at top of wall and travels downward through double wall void to bottom opening cut in inside wall. The air then travels up through the heat exchanger coil similar to conventional closed circuit fluid coolers.

It is desirable to have a heat exchange system that overcomes loss of spray water and also have a lower overall unit height.

SUMMARY OF INVENTION

One object of the invention is to provide a compact heat exchange system that minimizes loss of spray water, is efficient, and has a compact height, compact footprint, and provides less weight loading to a roof or other structure supporting the system.

The invention is directed to a heat exchange system for cooling heated fluid circulated from a heat source. The term heated fluid, could be, but is not limited to water, glycol, oil, or refrigerant. A vertically oriented central plenum is housed within a base structure, a plurality of upright side panels, and a top. The central plenum and the plurality of side panels define boundaries of a coil-air interface that houses a heat exchange coil. Above the heat exchange coil are sprayers that spray/distribute water downwardly over the heat exchange coil into the base structure, where the water is collected and pumped back to the sprayers. The plurality of side panels have air intakes that communicate outside air into the coil-air interface at a location above the sprayers and the heat exchange coil. A fan connected to the plenum draws air through the air intake, downwardly over the heat exchange coil located in the coil-air interface, generally horizontally into the plenum at an intake conduit, and then vertically to a central exhaust exit of the plenum.

The plenum can be described as including at least one horizontally-disposed lower located intake conduit that transitions to a vertically oriented exhaust conduit. The at least one intake conduit is for drawing air into the plenum. The at least one intake conduit is defined by at least one wall extending from a face opening, in a generally horizontal direction, to an intake transition end. The exhaust conduit conveys air from the at least one intake conduit. The exhaust conduit is defined by at least one central exhaust wall that extends generally vertically from a central exhaust transition end to a central exhaust exit. The transition is defined by at least one transition wall that extends from generally horizontal at the intake transition end to generally vertical at the central exhaust transition end.

In an embodiment of the present invention heat exchange system, mist eliminators are disposed within the at least one intake conduit of the plenum. The mist eliminators are defined as a plurality of surfaces that are oriented to create a flowpath by which mist-entrained air travels as the mist-entrained air is drawn through the at least one intake conduit of the plenum. The plurality of surfaces are generally parallel and have angular bends that vary the flowpath in a directional manner causing the mist-entrained air to impinge on the surfaces as the mist-entrained air travels through the flowpath, causing a mist to collect (or transfer) onto the surfaces. According to an embodiment of the present invention, the surfaces have a pitch that causes the mist to drain in a direction away from the centrally located exhaust conduit. In other words, the surfaces are generally higher in elevation at a central end than elevation at an intake end. In an embodiment of the present invention, the plenum includes a coil support surface for providing structural support to heat exchange coil equipment. The coil support surface is defined by a flange that protrudes outwardly from the centrally located exhaust conduit. The flange, preferably, is integral to the at least one wall forming the at least one intake conduit.

In an embodiment of the present invention, the plenum includes a coalescing structure located within the centrally located exhaust conduit for removing fluid that is entrained within air passing through the exhaust conduit. The coalescing structure comprises a helical strip.

In accordance with an embodiment of the present invention heat exchange system, a base structure is disclosed. The base structure is for aiding in the collection and redistribution of the spray water, and for supporting the side panels and the plenum. The base structure comprises a floor existing at a first average floor elevation and a plurality of upturned edges extending upwardly from the periphery of the floor and creating a catchment area. A raised plateau structure (RPS), (formed into or with or as a part of the floor) extends upwardly from the floor. The RPS forms a plenum support surface. The plenum support surface exists at a PSS elevation that is above the first average floor elevation. The RPS is located central to the base and occupies a RPS area less than the catchment area. A sump recess is located within the catchment. The sump recess has a SR floor existing at a sump average elevation that is lower than the first average floor elevation. The sump recess has at least one SR wall for communicating fluid from the floor to the SR floor. The drain conduit communicates fluid from the SR floor to a drain.

In accordance with an embodiment of the present invention, the base structure includes a standpipe. The standpipe comprises a conduit extending generally upwardly through the base structure to a top. The conduit has an aperture at an overflow elevation for communicating fluid into the conduit to the drain when the fluid reaches the overflow elevation.

In accordance with an embodiment of the present invention, the base structure includes a bleed off catchment defined by an expandable structure in fluidic communication with a waste conduit. The expandable structure is disposed to intercept (catch/receive/collect) a portion of the spray water falling to the floor of the base structure and convey the portion to the waste conduit. According to a preferred embodiment, the expandable structure of the bleed off catchment includes a manual setting structure to enable selective adjustment of the amount by which the plurality of surfaces overlap each other.

In accordance with an embodiment of the present invention, the base structure includes fork lift fork receiving channels. Said receiving channels are preferably located at a fork channel elevation below the drain recess. This is to minimize or eliminate any additional catch basin volume created by having the receiving channels above the drain recess.

In accordance with an embodiment of the present invention heat exchange system, a side panel is disclosed. The side panel comprises an outer surface extending between side edges from a bottom outer edge to a top outer edge, an inner surface extending between side edges from a bottom inner edge to a top inner edge, and an air intake connecting the outer surface to the inner surface for communicating outside air through the side panel into a coil-air interface space. The inner surface forms a protrusion that extends inwardly to define a cavity forming face and at least one adjoining face. The cavity forming face forms the outer boundary of the coil-air interface space when a plurality of side panels are positioned together on the base structure. The adjoining face is for abutting (or near abutting) another adjoining face of another side panel to minimize openings where spray water can leak outside the cabinet.

In accordance with an embodiment of the present invention, a method for cooling hot fluid circulated in a heat exchange coil is disclosed. The method comprises drawing air with a fan coupled to (or contained in or formed as) the plenum from a location outside of the cabinet. The air flowing into an air intake located on an upper portion a side panel of the plurality, into the coil-air interface containing the heat exchange coil i.) downwardly from the air intake over (through) the heat exchange coil, ii.) generally horizontally-inwardly through at least one intake conduit of the plenum from a face opening to an intake transition end, and iii.) vertically through a centrally located exhaust conduit for from a central exhaust transition end to a central exhaust exit. The method further includes, in the heat exchange cabinet, spraying water downwardly into the coil-air interface and on the heat exchange coil. The method further includes, in the heat exchange cabinet, collecting water sprayed on the heat exchange coil in a base structure, and returning water to the sprayers.

According to an embodiment of the present invention, a method for cooling hot fluid (water, glycol, oil or refrigerant) circulated in a heat exchange coil is disclosed. A coalesced stream of spray water and air is drawn downwardly over a heat exchange coil that surrounds a central exhaust plenum. The plenum is defined by a central exhaust wall that physically separates a plenum flowpath from the heat exchange coil. After passing downwardly through the coil, a portion of the spray water is separated from the air by drawing the air generally horizontally inward from a face opening through an intake conduit, to an intake transition end, while allowing a portion of the spray water to fall by gravity below the face opening of the intake conduit. The air is then drawn upwardly within the plenum from the intake transition end to an exhaust external to the enclosure. The spray water is then collected in a base structure and recirculated to the sprayers with a pump.

According to an alternate embodiment of the present invention, a heat exchange system is disclosed. The heat exchange system comprises a heat exchange cabinet. The heat exchange cabinet is defined by a vertically oriented central plenum housed within a base structure, a plurality of upright side panels, and a top. The central plenum and the plurality of side panels define boundaries of an coil-air interface that exists within the cabinet external to the plenum. A plenum coil-air interface is defined within the central plenum. A first HX coil is located in the plenum coil-air interface. The first HX coil is adapted to convey fluid from a HX1 inlet through a plurality of tubes to a HX1 outlet. A second HX coil is located in the coil-air interface. The second HX coil is adapted to convey fluid from a HX2 inlet through a plurality of tubes to a HX2 outlet. A third HX coil is located in the coil-air interface. The third HX coil is located above or below the second HX coil and is adapted to convey fluid from a HX3 inlet through a plurality of tubes to a HX3 outlet. Plumbing is provided and adapted to convey the heated fluid from a cabinet inlet to the first HX coil at a HX1 inlet, then from the HX1 outlet to the HX2 inlet, then from the HX2 outlet to the HX3 inlet, then from the HX3 outlet to a cabinet outlet. In operation, a plurality of sprayers spray water into the coil-air interface; a fan connected to the plenum causes air to be drawn from outside the cabinet downwardly with water from the sprayers through the coil-air interface over the second and third HX coils, into the plenum at an intake conduit, and then upwardly the plenum coil-air interface over the first HX coil to a central exhaust exit of the plenum at the top; and the heated fluid is circulited via the plumbing from a cabinet inlet to the first HX coil at a HX1 inlet, then from the HX1 outlet to the HX2 inlet, then from the HX2 outlet to the HX3 inlet, then from the HX3 outlet to a cabinet outlet.

According to an alternate embodiment of the present invention, a method for cooling hot fluid (water, glycol, oil or refrigerant) circulated in a heat exchange coil is disclosed. The method comprises the steps of providing a heat exchange cabinet, drawing a coalesced stream of spray water and air downwardly through the coil-air interface, over a second HX coil and third HX coil contained within the coil-air interface. After passing downwardly through the coil-air interface, a portion of the spray water is separated from the air by drawing the air generally horizontally inward from a face opening through an intake conduit, to an intake transition end, while allowing a portion of the spray water to fall by gravity below the face opening of the intake conduit. Air is drawn upwardly through the plenum coil-air interface, over the first HX coil, from the intake transition end to an exhaust external to the enclosure. A hot fluid from a heat source is conveyed to the first HX coil, then to the second HX coil, then to the third HX coil, then back to the heat source.

Additional features, advantages, and embodiments of the invention may be set forth or apparent from consideration of the following detailed description. Moreover, it is to be understood that both the foregoing summary of the invention and the following detailed description are exemplary and intended to provide further explanation without limiting the scope of the invention.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE EMBODIMENTS

Figure 1:
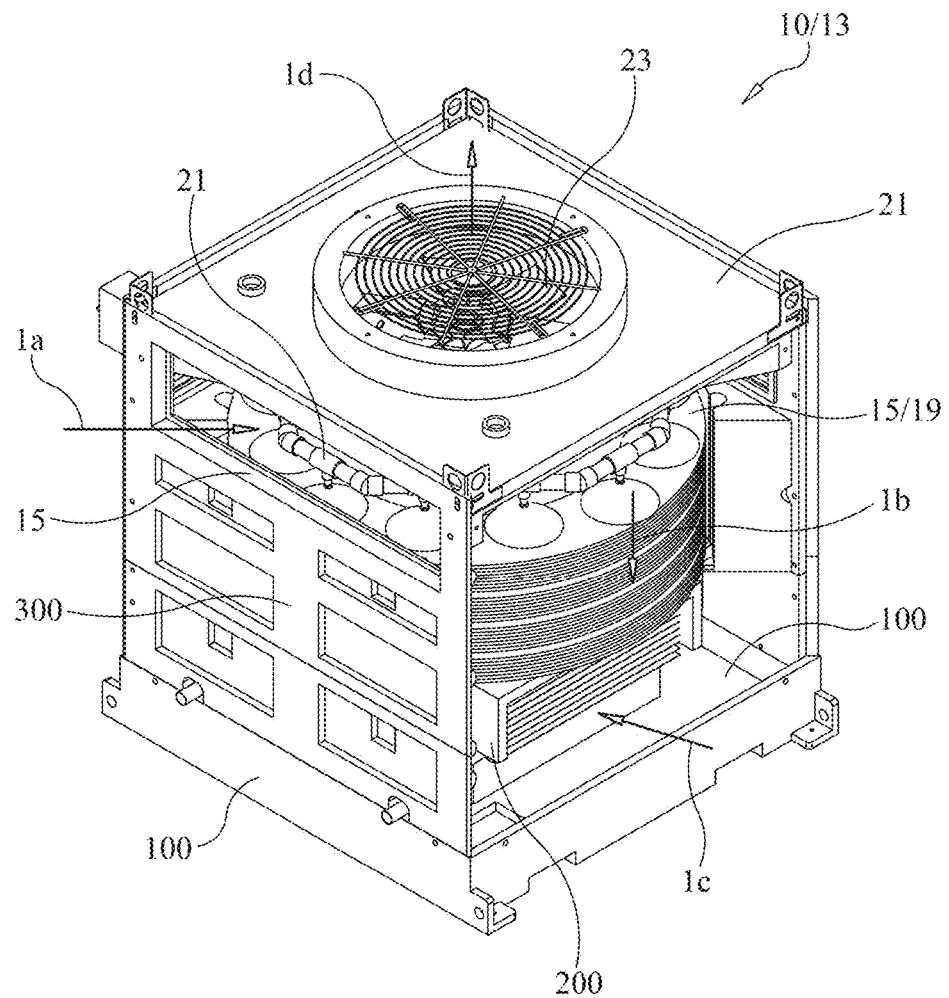
FIG. 1 is a partial schematic isometric view of an embodiment of the present invention heat exchange system.
Figure 2:
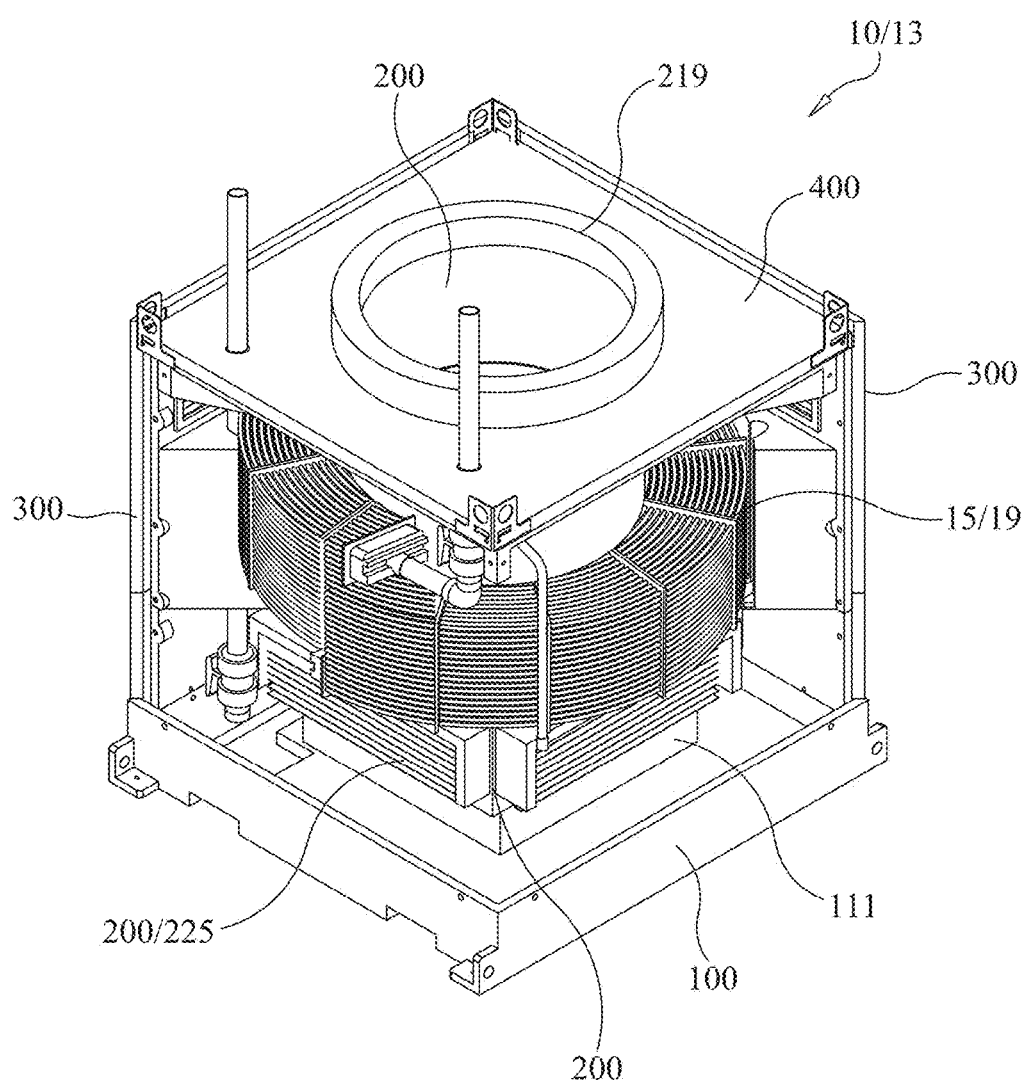
FIG. 2 is a partial schematic isometric view of an embodiment of the present invention heat exchange system.
Figure 3:
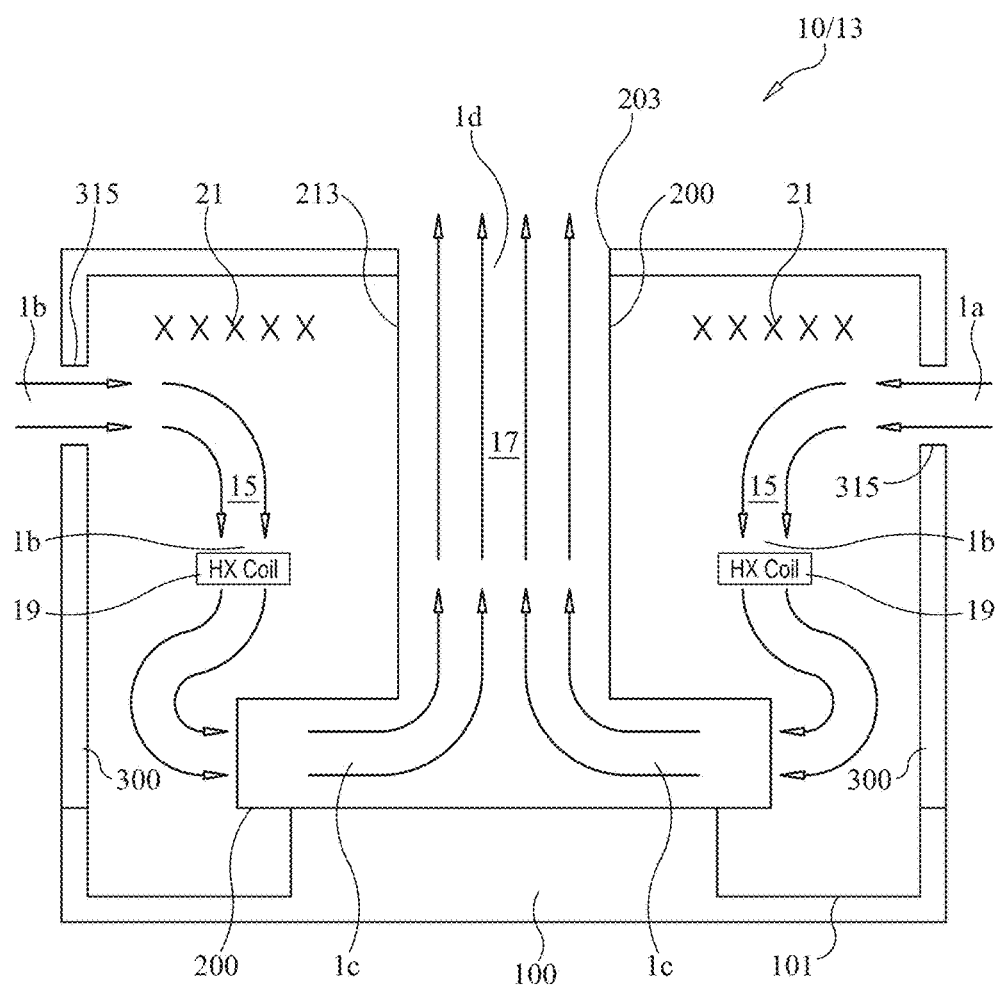
FIG. 3 is a partial schematic representation of the heat exchange system showing airflow.

Referring now to the Figures in general, and specifically to FIG. 1-FIG. 3, embodiments of the present invention are directed to a compact heat exchange system 10. The heat exchange system 10 for cooling heated fluid circulated from a heat source 11. A vertically oriented central plenum 200 is housed within a base structure 100, a plurality of upright side panels 300, and a top 400. The central plenum 200 and the plurality of side panels 300 define boundaries of a coil-air interface 15 that houses a heat exchange coil 19. Above the heat exchange coil 19 are sprayers 21 that spray/distribute water downwardly over the heat exchange coil 19 into the base structure 100, where the water is collected and pumped back to the sprayers 21. The plurality of side panels 300 have air intakes 313 that communicate outside air into the coil-air interface 15 at a location above the sprayers 21 and heat exchange coil 19. A fan 23 connected to the plenum 200 draws air through the air intake 313, downwardly over the heat exchange coil 19 located in the coil-air interface 15, generally horizontally into the plenum 200 at an intake conduit 205, and then vertically to a central exhaust exit 219 of the plenum 200.

FIG. 1 shows the heat exchange system 10, cabinet 13 having one side panel 300 removed, and includes arrows showing flow of air through the system 10. Arrow 1a shows outside air flowing into the air intake 313 of a side wall. Arrow 1b shows the downward flow of air and water from the sprayers 21 through the heat exchange coil 19 located within the coil-air interface 15. The arrow 1b shows a combined flow of air and spray water, and the arrow 1b is shown relative to a removed side panel 300 for clarity. The arrow 1c shows airflow into the plenum 200. Arrow 1d shows airflow out of the plenum 200.

FIG. 2 shows the heat exchange system 10, cabinet 13 having the fan 53 and two side panels 300 removed, and having a helical type heat exchange coil 19 in the coil-air interface 15. FIG. 3 is a schematic representation of the heat exchange system 10 according to an embodiment of the present invention. FIG. 3 shows the airflow in the form of arrows. Arrows 1a show outside air flowing into the air intake 313 of a side wall. Arrows 1b show the downward flow of air and water from the sprayers 21 through the heat exchange coil 19 located within the coil-air interface 15. The arrows 1c show airflow into the plenum 200. Arrows 1d show airflow out of the plenum 200.

Figure 4:
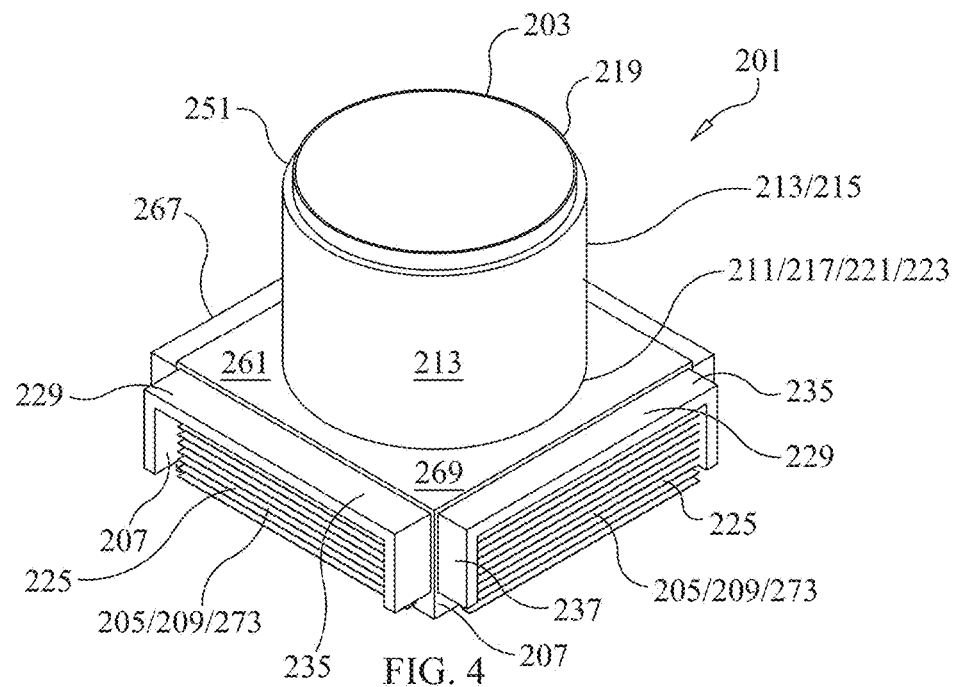
FIG. 4 is a top isometric view of the plenum according to an embodiment of the present invention.
Figure 5:
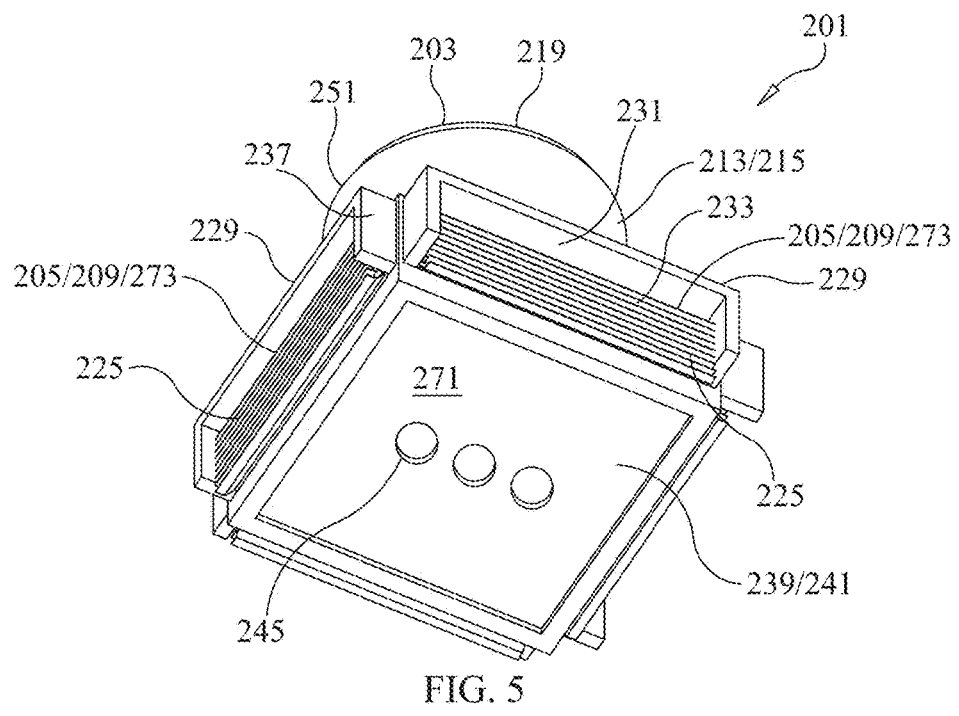
FIG. 5 is a bottom isometric view of the plenum according to an embodiment of the present invention.
Figure 6:
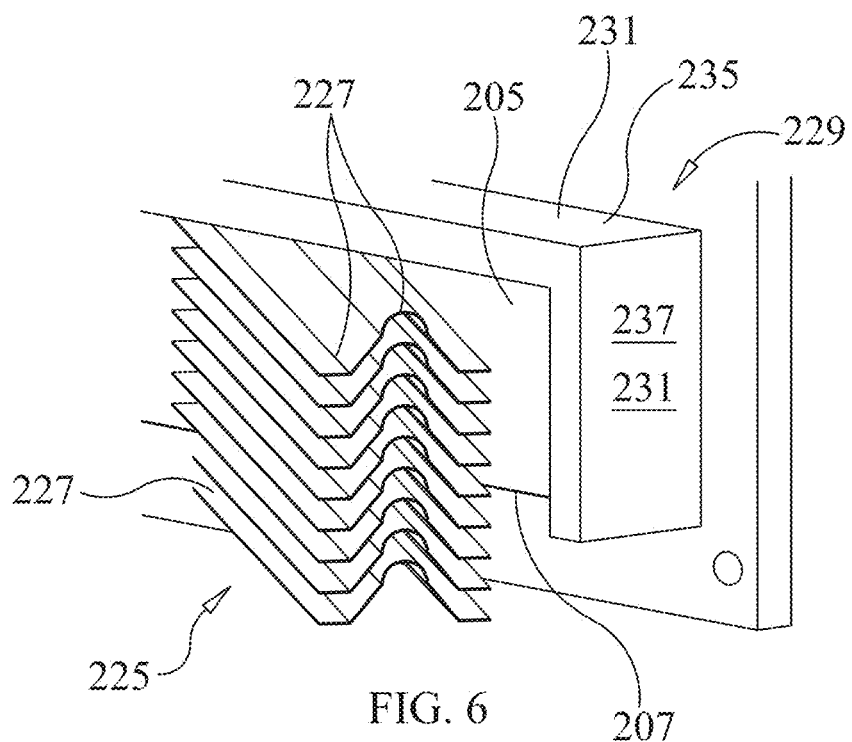
FIG. 6 is a partial view of the intake conduit of the plenum according to an embodiment of the present invention.
Figure 7:
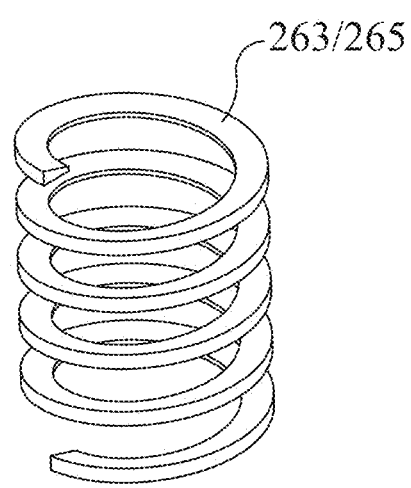
FIG. 7 is a top isometric view of a coalescing structure according to an embodiment of the present invention.
Figure 8:
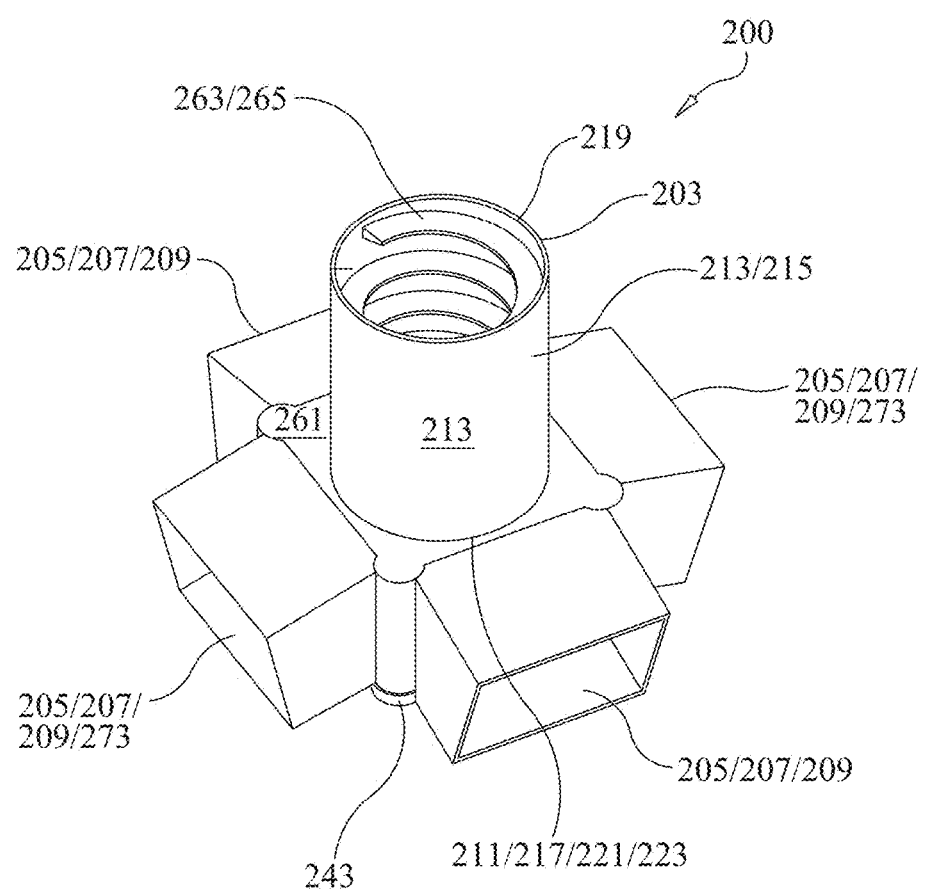
FIG. 8 is a top isometric view of the plenum according to an embodiment of the present invention.

Referring to FIGS. 4 and 5, the plenum 200 can be described as including at least one horizontally-disposed lower located intake conduit 205 that transitions to a vertically oriented exhaust conduit 213. The at least one intake conduit 205 is for drawing air into the plenum 200. The at least one intake conduit 205 is defined by at least one wall 207 extending from a face opening 209, in a generally horizontal direction, to an intake transition end 211. The exhaust conduit 213 conveys air from the at least one intake conduit 205, and the exhaust conduit 213 is defined by at least one central exhaust wall 215 that extends generally vertically from a central exhaust transition end 217 to a central exhaust exit 219. The transition 221 is defined by at least one transition wall 223 that extends from generally horizontal at the intake transition end 211 to generally vertical at the central exhaust transition end 217.

Important to the design of the heat exchange system 10 are the areas of the exhaust conduit 213 and the face opening(s) 209 of the plenum 200. The central plenum 200 has an exhaust plenum face area defined as the cross sectional area within exhaust conduit 213 formed by the at least one central exhaust wall 215. The plenum 200 having an intake conduit 213 total face area defined by the sum of the area of the face opening(s) 209 of the at least one intake conduit 205 and one or more additional areas of additional face openings 209 of additional intake conduits 205 of the plenum 200. The total face area of the intake conduit(s) 205 should be maximized to slow the velocity of the mist-entrained air that enters the plenum 200 at the intake conduit(s). Decreased air velocities into the intake conduit(s) will result in improving separation of water/mist from the airflow/airstream as it enters the plenum 200. Also, smaller areas result in higher air velocities, which contribute to noise.

Alternately stated, the plenum has a total face area defined summing the area of the face opening 209 of the at least one intake conduit 205, and also summing one or more additional areas of additional face openings 209. Ideally, the total face area for a given unit height is larger than a surface area of the central exhaust conduit 213 for the same given unit height. This is to minimize a face opening air velocity, that is dependent on said total face area for a given height, to promote the de-entrainment of spray water from the air entering the plenum.

Also important to the design of the heat exchange system 10 is the area of the coil-air interface 15. The coil-air interface 15 has a coil face area defined as the area between the central plenum 200 and the plurality of side panels 300. According to known principles of heat transfer theory, this area is important for determining overall heat exchange from the size of the heat exchange coil 19 that can fit within the coil-air interface 15.

In a preferred embodiment of the present invention, the fan 53 draws air through the coil-air interface 15 at a coil velocity range between about 400-800 fpm. Ideally, the ratio of coil face area to exhaust plenum face area is in the range from about 2 to 1-3.5 to 1. The intake conduit 205 total face area of the plenum 200 is large enough to pass the air through the intake conduit 205 total face area at a velocity of 1,500 fpm or less, and optimally at 850 fpm or lower. Further, the intake conduit 205 total face area is no less than about 43% of the coil face area, and optimally about 77% of the coil face area. The plenum 200 optimally has the ratio of exhaust plenum face area to the intake conduit total face area within the range of about 1 to 2, or 40%-60%.

Referring to FIG. 6, in an embodiment of the present invention heat exchange system 10, mist eliminators 225 are disposed within the at least one intake conduit 205 of the plenum 200. The mist eliminators 225 are defined as a plurality of surfaces 227 that are oriented to create a flowpath by which mist-entrained air travels as the mist-entrained air is drawn through the at least one intake conduit 205 of the plenum 200. The plurality of surfaces 227 are generally parallel and have angular or radial bends 227 that vary the flowpath in a directional manner causing the mist-entrained air to impinge on the surfaces 227 as the mist-entrained air travels through the flowpath. This enables mist to collect (or transfer) onto the surfaces 227. According to an embodiment of the present invention, the surfaces 227 have a pitch that causes the mist to drain in a direction away from the centrally located exhaust conduit 213. In other words the surfaces 227 are generally higher in elevation at a central end than elevation at an intake end. This allows water to drain outwardly into the sump.

In a preferred embodiment of the present invention, the plenum 200 includes an air inlet frame 229 (FIGS. 4-6) for directing falling water away from the face opening 209 of the at least one intake conduit 205. The air inlet frame 229 defined by a lip 231 or protrusion 231 that extends outwardly at a portion of a periphery 233 of the face opening 209 of the at least one intake conduit 205, wherein the portion of the periphery 233 is a top portion 235 and/or one or more side portions 237.

In an embodiment of the present invention, the plenum 200 further includes a plenum base 239 (FIG. 5) that is defined by at least one plenum base wall 241 existing lowermost that forms part of the at least one intake conduit 205. The plenum base 239 is for supporting the plenum 200, isolating airflow through the plenum 200, and/or providing a coupling mechanism 243 for attaching to and being supported by a base structure 100. The plenum base 239 may have one ore more drain apertures (holes) 245 for allowing fluid to drain from the plenum 200 to a base structure 100.

In an embodiment of the present invention, the plenum 200 includes a coil support surface 261 (FIG. 4) for providing structural support to heat exchange coil equipment, such as the heat exchange coil, manifolds, and piping. The coil support surface 261 is defined by a flange 261 that protrudes outwardly from the centrally located exhaust conduit 213. The flange 261, preferably, is integral to the at least one wall 207 forming the at least one intake conduit 205.

In an embodiment of the present invention, the plenum 200 includes a coalescing structure 263 (FIGS. 7-8) located within the centrally located exhaust conduit 213 for removing fluid that is entrained within air passing through the exhaust conduit 213. The coalescing structure comprising a helical strip 265. In operation, the helical strip 265 provides a surface upon which mist-entrained air contacts and water/mist deposits on the strip 265.

Referring to FIGS. 9-10, in accordance with an embodiment of the present invention heat exchange system 10, a base structure 100 is disclosed. The base structure 100 is for aiding in the collection and redistribution of the spray water, and for supporting the side panels 300 and the plenum 200. The base structure 100 comprises a floor 101 existing at a first average floor elevation 103, and a plurality of upturned edges 105 extending upwardly from the periphery 107 of the floor 101 and creating a catchment area 109. A raised plateau structure 111 (RPS), (formed into or with or as a part of the floor) extends upwardly from the floor 101. The RPS 111 forms a plenum support surface 113. The plenum support surface 113 exists at a PSS elevation 115 that is above the first average floor elevation 103. The RPS 111 is located central to the base 100 and occupies a RPS area 117 less than the catchment area 109. The RPS area may also have cooperating structures such as keys, keyways, holes, tabs, recesses, protrusions, or the like, that are adapted to fitably mate with the same of a plenum 20 for an ideal inter-fitment.

A sump recess 119 is located within the catchment 109. In an embodiment, the sump recess 119 is located inside or outside the RPS area 117. The sump recess 119 has a SR floor 121 existing at a sump average elevation 123 that is lower than the first average floor elevation 103. The sump recess 119 has at least one SR wall 125 for communicating fluid from the floor 1012 to the SR floor 121. SR wall 125 includes, within the understanding of this description, a conduit or open channel that conveys fluid. The drain conduit 135 communicates fluid from the SR floor 121 to a drain. The drain conduit 135 includes, within the meaning of this description, a conduit or open channel that conveys fluid.

Referring to FIGS. 10-11, in accordance with an embodiment of the present invention, the base structure 100 includes a standpipe 139. The standpipe 139 comprises a conduit **139*a* that extends generally upwardly through the base structure 100 to a top 139*b*/400. The conduit 139*a* has an aperture 141 at the overflow elevation 143** for communicating fluid into the conduit 139a to the drain 137 (not shown) when the fluid reaches an overflow elevation 143.

In accordance with an embodiment of the present invention, the base structure 100 includes a bleed off catchment 145 defined by an expandable structure 147 in fluidic communication with a waste conduit 149. The expandable structure 147 is disposed to intercept (catch/receive/collect) a portion of the spray water falling to the floor 101 of the base structure 100 and convey the portion to the waste conduit 149.

In a preferred embodiment, the expandable structure 147 of the bleed off catchment 145 is defined by a plurality of overlapping part surfaces 151. A total surface area of the expandable structure 147 exposed to intercept the portion of the spray water is inversely proportional to the an amount by which the plurality of surfaces 151 overlap each other of the plurality of surfaces 151.

According to a preferred embodiment, the expandable structure 147 of the bleed off catchment 145 includes a manual setting structure 153 to enable selective adjustment of the amount by which the plurality of surfaces 151 overlap each other. In a preferred embodiment, the manual setting structure 153 includes: a slot 155 formed into at least one surface 151 of the plurality of overlapping part surfaces 151; a threaded member 157 passing through the slot 155; and one or more thread cooperating members 159 for fixing the at least one surface 151 of the plurality of overlapping part surfaces 151 to an other surface 151 of the plurality of overlapping part surfaces 151.

According to an embodiment of the present invention, the expandable structure 147 of the bleed off catchment 145 includes: a first partial box surface 163, and a second partial box surface 173. The first partial box surface 163 includes a bottom 163a and three sides 163b extending upwardly from the bottom 163a, thereby leaving an open top 163c and an open end 163d. The second partial box surface 173 includes a bottom 173a and three sides 173b extending upwardly from the bottom 173a, thereby leaving an open top 173c and an open end 173d. One of the first partial box surface 163 and second partial box surface 173 has a open end width 175 that is larger than an other open end width 177 to enable one of the first partial box 163 and second partial box 173 to slide within an other of the first partial box 163 and second partial box 173. One of the first partial box surface 163 and second partial box surface 173 has a waste conduit fitting 179 in the bottom 163a/173a to fluidically couple with the waste conduit 149.

In an embodiment of the present invention, the bleed off catchment further includes a waste conduit fitting 179 and an aperture 141. The waste conduit fitting 179 formed into (connected to or formed part of) the expandable structure 147. The waste conduit fitting 179 having at least one wall 181 communicating an expandable structure top surface 183 to a waste conduit fitting outlet 185. The aperture 141 is for communicating fluid into the waste conduit fitting to the waste conduit fitting outlet 185 when the fluid reaches the aperture 141. In a preferred embodiment, the aperture 141 is located below the expandable structure 147.

Figure 9:
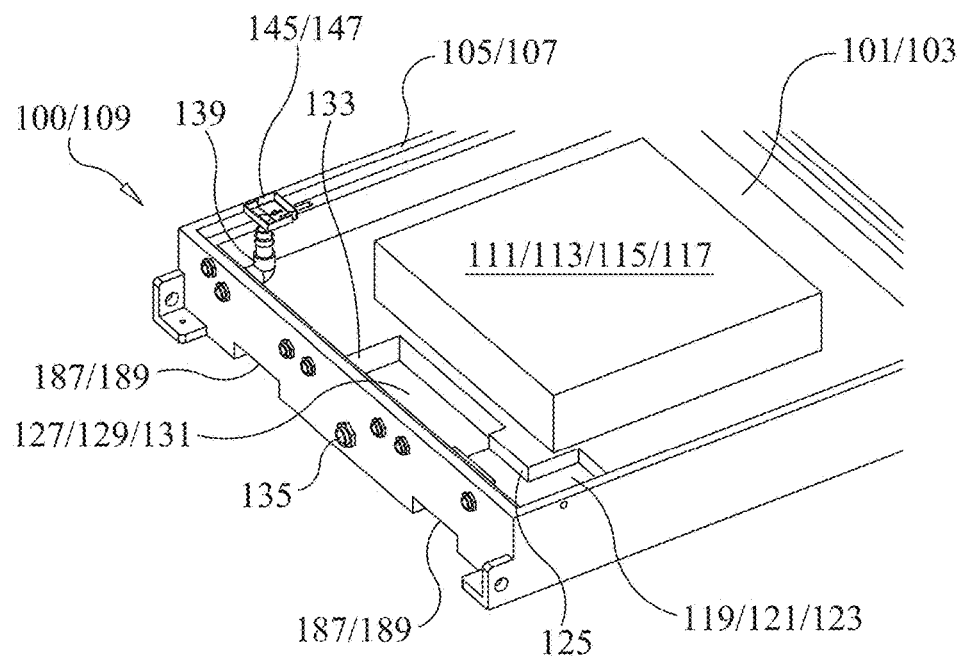
FIG. 9 is a top isometric view of the base according to an embodiment of the present invention.
Figure 10:
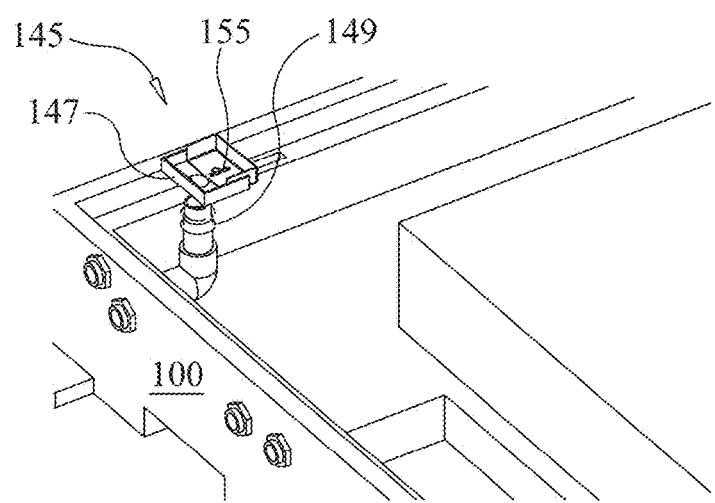
FIG. 10 is a top isometric view showing a standpipe and bleed off catchment of the base according to an embodiment of the present invention.
Figure 11:
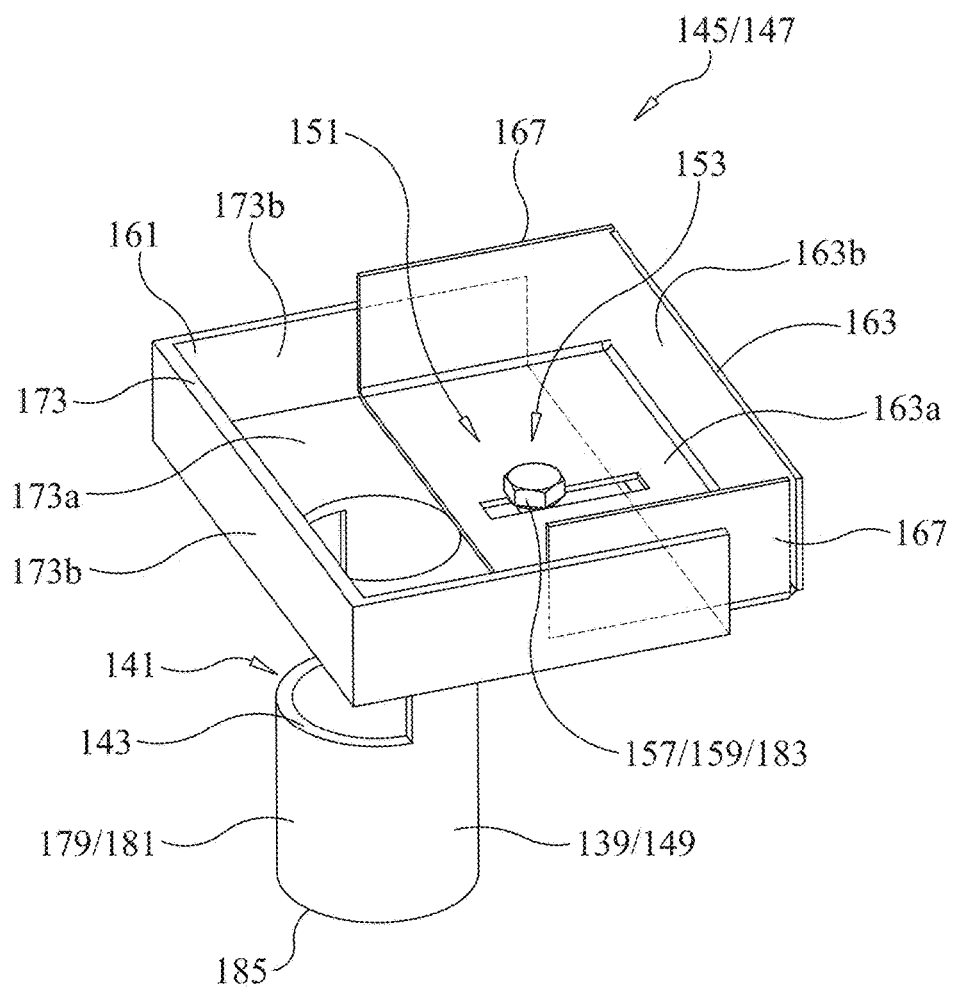
FIG. 11 is a top isometric view showing a bleed off catchment of the base according to an embodiment of the present invention.

In accordance with an embodiment of the present invention, the base structure 100 includes fork lift fork receiving channels 187 (FIG. 9). Said receiving channels 187 are preferably located at a fork channel elevation 189 below the drain recess 127 so that the receiving channels 187 do not contribute to the overall volume of the catchment area 109.

Figure 12:
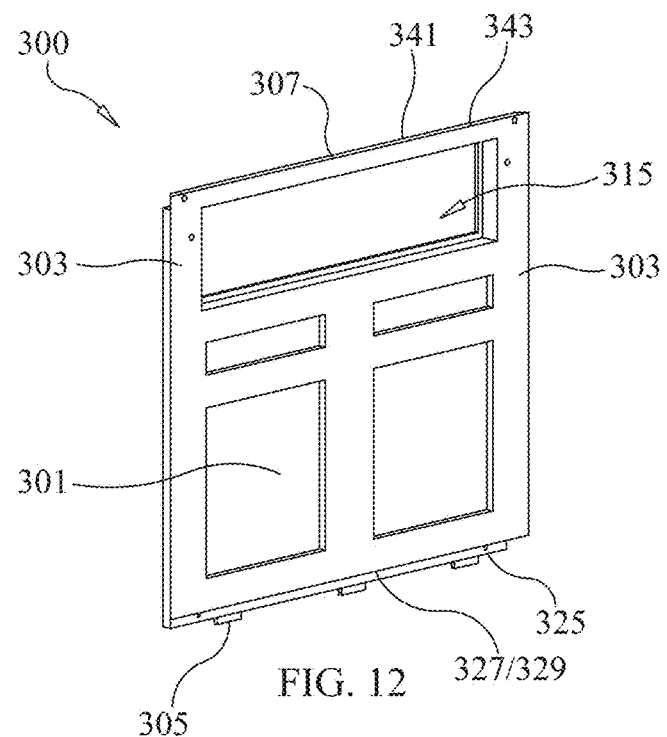
FIG. 12 is a top front isometric view of a side panel according to an embodiment of the present invention.
Figure 13:
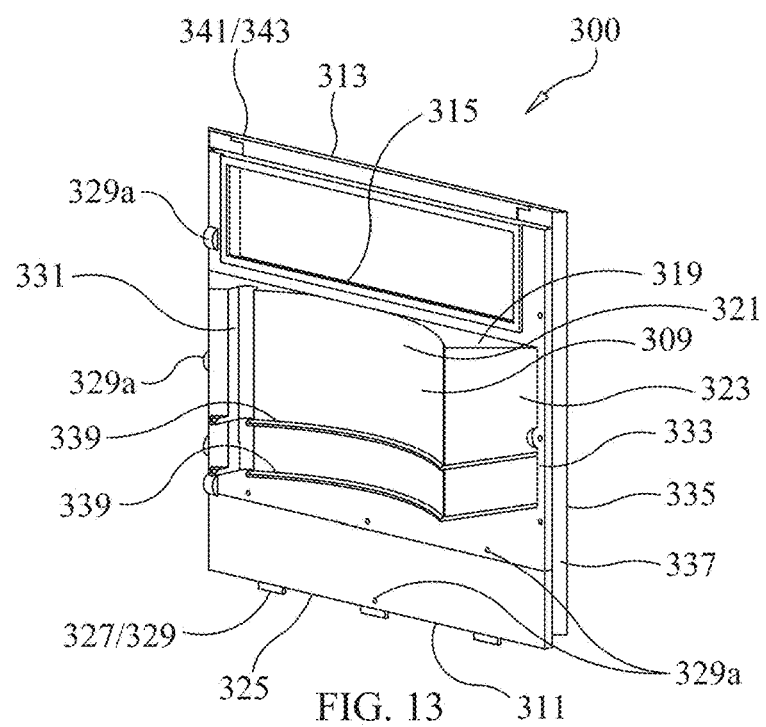
FIG. 13 is a top rear isometric view of a side panel according to an embodiment of the present invention.
Figure 14:
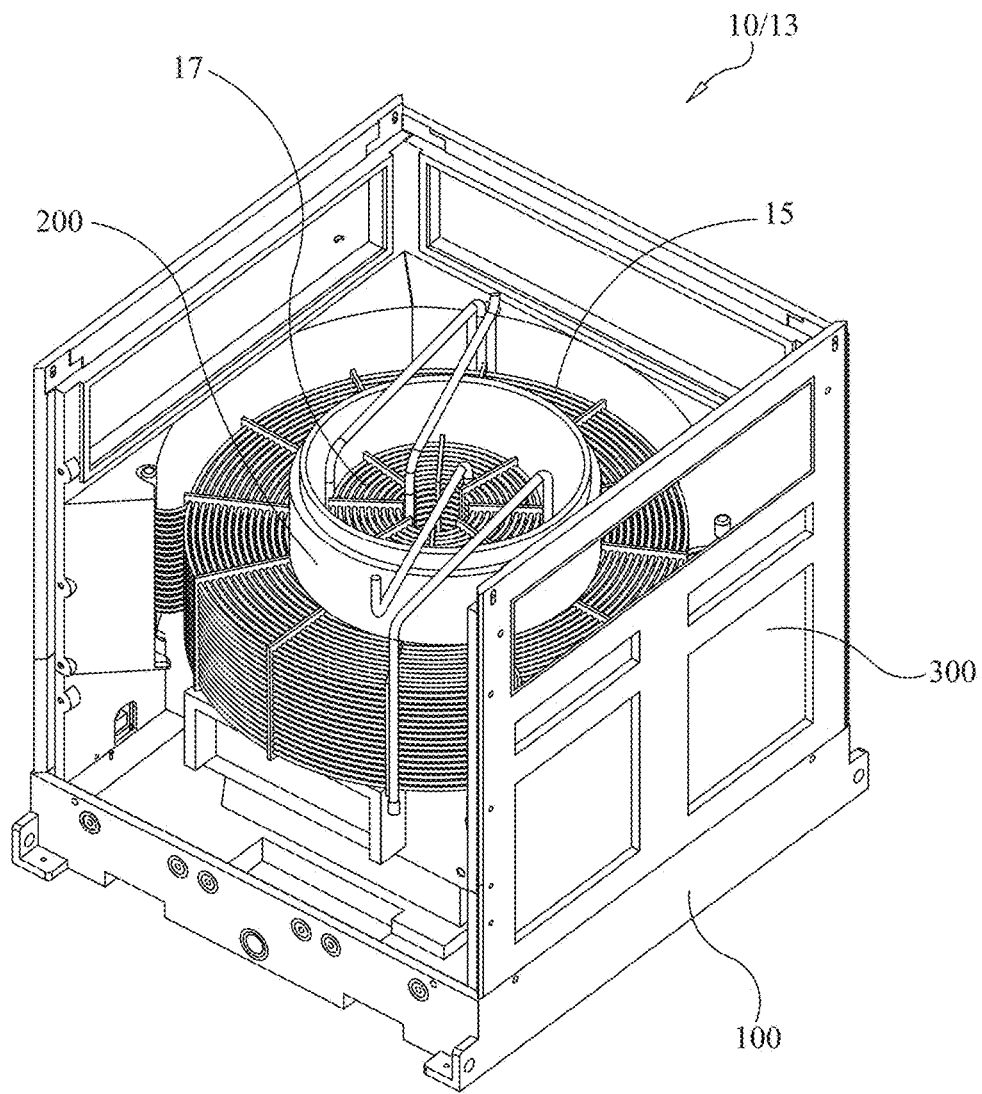
FIG. 14 is a partial schematic isometric view of an embodiment of the present invention heat exchange system.

Referring to FIGS. 12-13, in accordance with an embodiment of the present invention heat exchange system 10, a side panel 300 is disclosed. The side panel 300 comprises an outer surface 301 extending between side edges 303 from a bottom outer edge 305 to a top outer edge 307, an inner surface 309 extending between side edges 303 from a bottom inner edge 311 to a top inner edge 313. An air intake 315 connects the outer surface 301 to the inner surface 309 for communicating outside air through the side panel 300 into a coil-air interface space 15. The inner surface 309 forms a protrusion 319 that extends inwardly to define a cavity forming face 321 and at least one adjoining face 323. The cavity forming face 321 forms the outer boundary of the coil-air interface 15 space when a plurality of side panels 300 are positioned together on the base structure 100. The adjoining face 323 is for abutting (or near abutting) another adjoining face 323 of another side panel 300 to minimize openings where spray water can leak outside the cabinet 13. The side panel of claim 28, the outer surface, inner surface, and air intake formed by a single wall utilizing rotational molding.

In a preferred embodiment, the side panel 300 further includes a base coupling interface 325 for coupling the side panel 300 to the base structure 100, or a sill 326 that connects with the base structure 100. The base coupling interface 325 is defined by or comprises one or more of a bottom outer edge 305 that is offset vertically from the bottom inner edge 311 by one or more base lip surfaces 327. The base coupling interface 325 includes one or more of tabs, recesses, keys, or keyways 329; one or more lap joints 329; and one or more threaded nut inserts 329a molded into the side panel 300.

In a preferred embodiment, the side panel 300 further includes one or more races, chases and/or recesses 331 extending vertically through the protrusion 319 for providing a pathway for piping, tubing or electrical cabling. Preferably, the one or more races, chases and/or recesses 331 are formed integral to the panel 300 by means of rotational molding.

The side panel 300 further has an inner side edge 333 and an outer side edge 335, wherein the inner side edge 333 is offset from the outer side edge 335 by one or more side lip surfaces 337 to enable overlapping and secure inter-fitment among adjoining side panels 300 or other structures. In a preferred embodiment, the protrusion 319 has a portional cross-sectional shape of an arc, a partial arc, and/or a semicircle to encompass a circular heat exchange coil. The protrusion 319 may have a support abutment, notch groove, recess, or ledge 339 for providing vertical load bearing support to one or more support structures that span inwardly from one side panel to another side panel. The side panel 300 preferably includes a top coupling interface 341 for coupling the side panel 300 to a top 400. The top coupling interface 341 is defined by or comprises one or more of:
 a. the top outer edge 307 that is offset vertically from the top inner edge 313 by one or more top lip surfaces 343;
 b. one or more tabs, recesses, keys, or keyways or lap joints 329; and
 c. one or more threaded nut inserts 329a molded into the side panel.

In accordance with an embodiment of the present invention, a method for cooling hot fluid (water, glycol, oil or refrigerant) circulated in a heat exchange coil is disclosed. The method comprises providing a heat exchange system 10/cabinet 13 as disclosed herein. Then, drawing air with a fan 23 coupled to (or contained in or formed as) the plenum 200 from a location outside of the cabinet 13, into an air intake 315 located on an upper portion a side panel 300 of the plurality of side panels 300, into the coil-air interface 15 containing the heat exchange coil 319 i.) downwardly from the air intake 315 over (through) the heat exchange coil 19, ii.) generally horizontally-inwardly through at least one intake conduit 205 of the plenum 200 from a face opening 209 to an intake transition end 311, and iii.) vertically through a centrally located exhaust conduit 213 for from a central exhaust transition end 317 to a central exhaust exit 319. The method further includes, in the heat exchange cabinet 13, spraying water downwardly into the coil-air interface 15 and on the heat exchange coil 19. The method further includes, in the heat exchange cabinet 13, collecting water sprayed on the heat exchange coil 19 in a base structure 100, and returning water to the sprayers 21.

According to an embodiment of the present invention, a method for cooling hot fluid (water, glycol, oil or refrigerant) circulated in a heat exchange coil 19 is disclosed. A coalesced stream of spray water and air is drawn downwardly over a heat exchange coil 19 that surrounds a central exhaust plenum 200. The plenum 200 is defined by a central exhaust wall 215 that physically separates a plenum flowpath from the heat exchange coil 19. After passing downwardly through the coil 19, a portion of the spray water is separated from the air by drawing the air generally horizontally inward from a face opening 209 through an intake conduit 205, to an intake transition end 211, while allowing a portion of the spray water to fall by gravity below the face opening 209 of the intake conduit 205. The air is then drawn upwardly within the plenum 200 from the intake transition end 211 to an exhaust 203 external to the enclosure 13. The spray water is then collected in a base structure 100 and recirculated to the sprayers 21 with a pump.

Referring now to FIGS. 14-18, an alternate embodiment of the present invention, a heat exchange system 10 is disclosed. The heat exchange system 10 comprises a heat exchange cabinet 13. The heat exchange cabinet 13 is defined by a vertically oriented central plenum 200 housed within a base structure 100, a plurality of upright side panels 300, and a top 400. The central plenum 200 and the plurality of side panels 200 define boundaries of a coil-air interface 15 that exists within the cabinet 13 external to the plenum 200. A plenum coil-air interface 17 is defined within the central plenum 200. A first HX coil 25 is located in the plenum coil-air interface 17. The first HX coil 25 is adapted to convey fluid from a HX1 inlet 25a through a plurality of tubes 41 to a HX1 outlet 25b. A second HX coil 27 is located in the coil-air interface 15. The second HX coil 27 is adapted to convey fluid from a HX2 inlet 27a through a plurality of tubes 41 to a HX2 27b outlet. A third HX coil 29 is located in the coil-air interface 15. The third HX coil 29 is located above or below the second HX coil 27 and is adapted to convey fluid from a HX3 inlet 29a through a plurality of tubes 41 to a HX3 outlet 29b. Alternately, slab type coils, or other type coils in the art can be used in place of the HX coils.

An advantage of such a configuration disclosed herein is that it allows the hottest fluid to reach the air in the plenum 200 first, after the air has been wetted. The hot coil (first HX coil 25) helps to heat the wet air stream well above its saturation temperature and thus mitigates plume formation above the exhaust exit 219 of the cabinet 13 on cold winter days. The air is better utilized in the cabinet 13, allowing the air stream to carry off the hottest air last, rather than through the cabinet. The liquid from the heat source 10, after exiting the first HX coil 25, is cooled some before entering the second HX coil 27 and third HX coil 29 located in the wetted coil-air interface 19 reducing the tendency to build scale on the second HX coil 27 and third HX coil 29. Moreover, drier air is exhausted from the plenum 200 past the fan 53 motor, which results in lower fan motor bearing and winding dedregation.

Plumbing 31 is provided and adapted to convey the heated fluid from a cabinet inlet 33 to the first HX coil 25 at a HX1 inlet 25a, then from the HX1 outlet 25b to the HX2 inlet 27a, then from the HX2 outlet 27b to the HX3 inlet 29a, then from the HX3 outlet 29b to a cabinet outlet 35.

Figure 15:
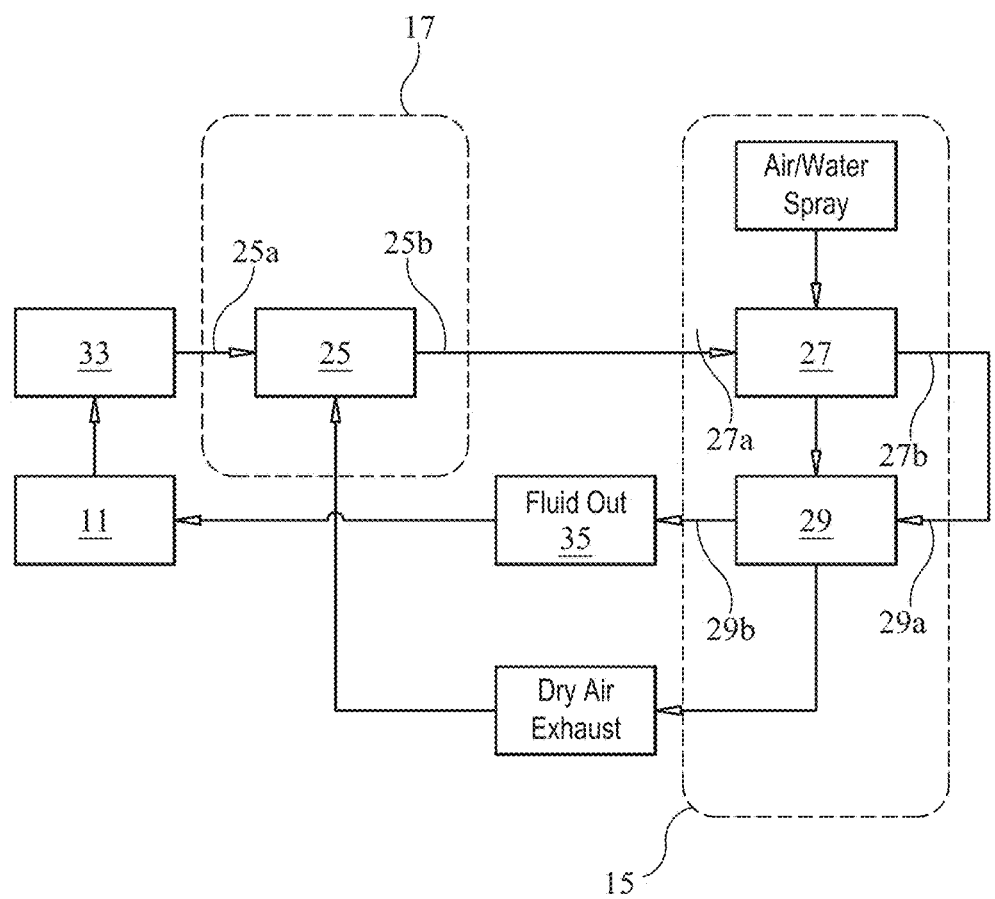
FIG. 15 is a schematic representation diagram of fluid flow and air flow in a cabinet according to an embodiment of the present invention heat exchange system.
Figure 16:
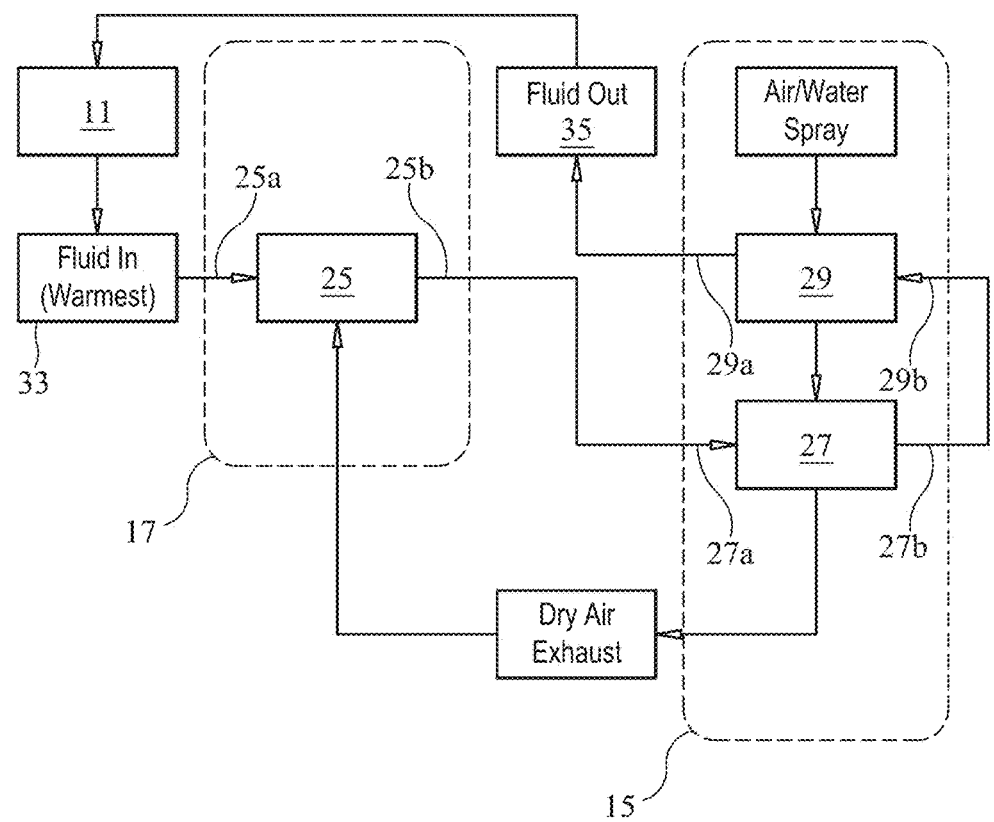
FIG. 16 is a schematic representation diagram of fluid flow and air flow in a cabinet according to an embodiment of the present invention heat exchange system.

FIGS. 15 and 16 are refrigerant (cooling liquid) airflow diagrams that show how the refrigerant passes through the various HX coils 25, 27, and 29 and interacts with air passing through the cabinet 13 in the coil-air interface 15 and the plenum coil-air interface 19.

In operation, a plurality of sprayers 21 spray water into the coil-air interface 15; a fan 53 connected to the plenum 200 causes air to be drawn from outside the cabinet 13 downwardly with water from the sprayers 21 through the coil-air interface 15 over the second and third HX coils 27, 29, into the plenum 200 at an intake conduit 205, and then upwardly through the plenum coil-air interface 17 over the first HX coil 25 to a central exhaust exit 219 of the plenum 200 at the top 400. The heated fluid is circulited via the plumbing 31 from a cabinet inlet 33 to the first HX coil 25 at a HX1 inlet 25a, then from the HX1 outlet 25b to the HX2 inlet 27a, then from the HX2 outlet 27b to the HX3 inlet 29a, then from the HX3 29b outlet to a cabinet outlet 35.

Figure 17:
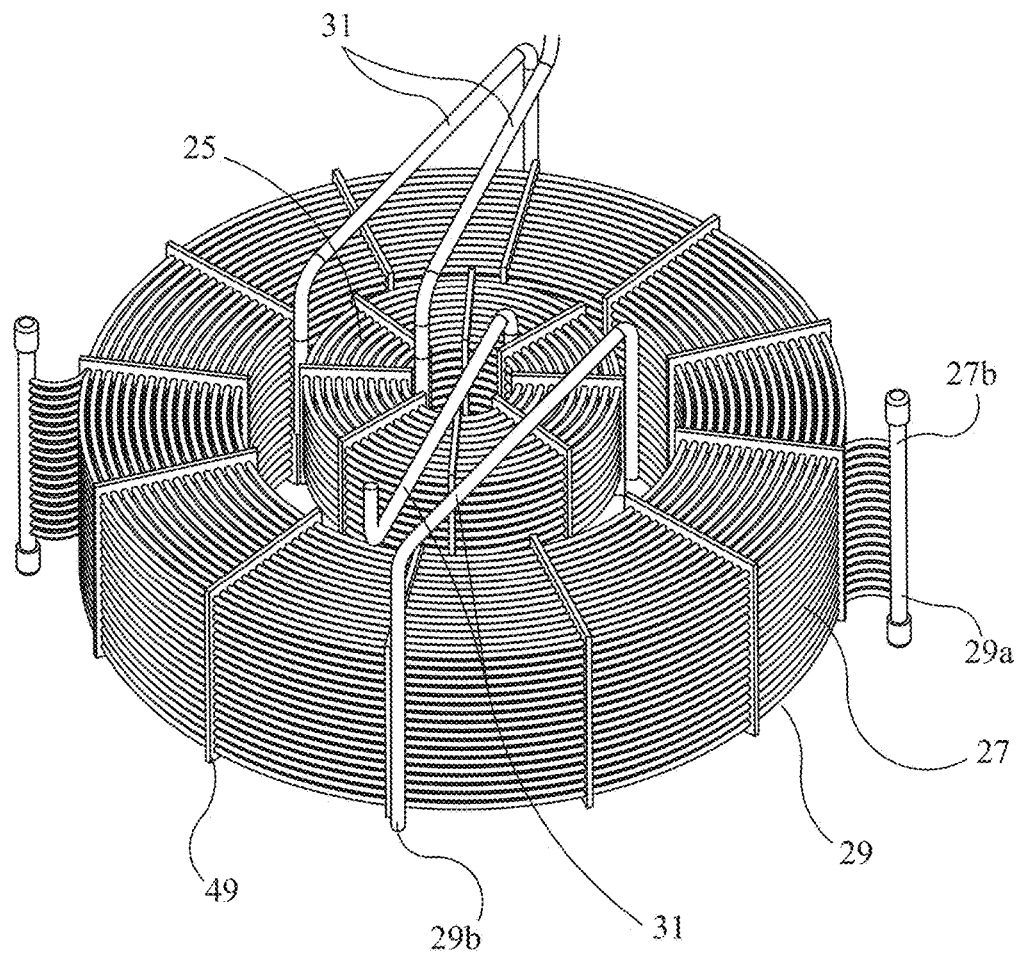
FIG. 17 is an isometric top schematic view showing various spiral heat exchange coils according to an embodiment of the present invention heat exchange system.
Figure 18:
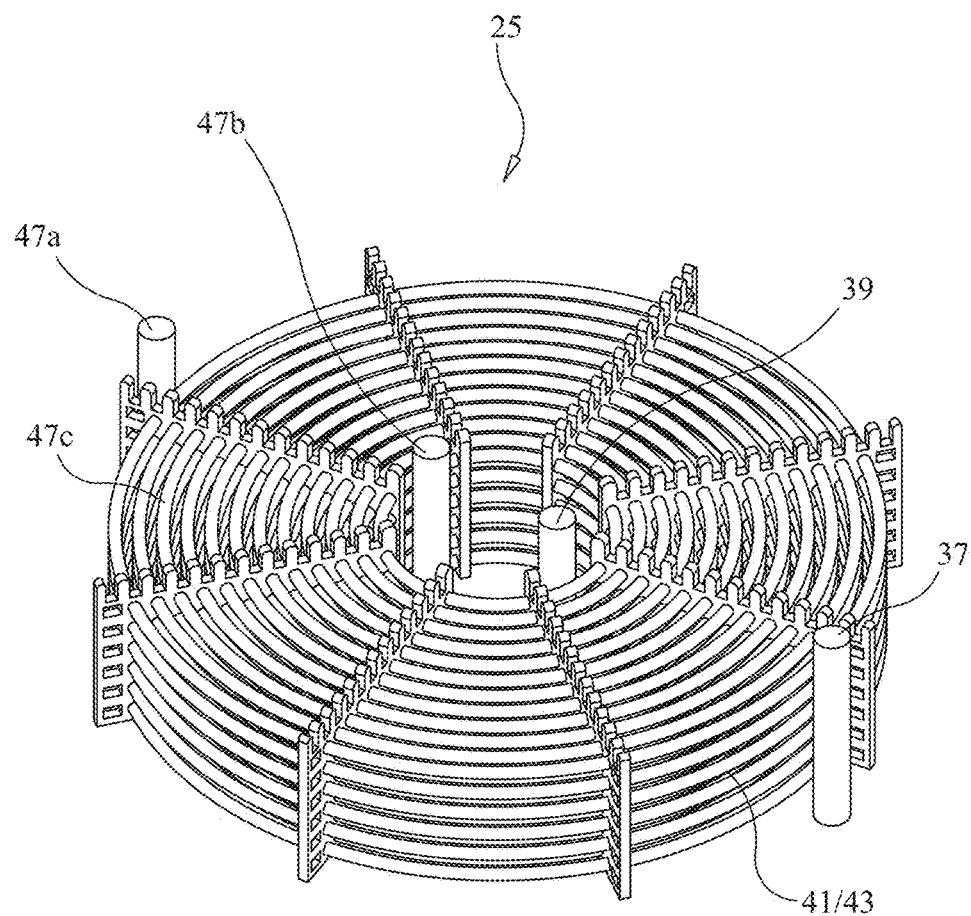
FIG. 18; is an isometric top schematic view showing a spiral heat exchange coil according to an embodiment of the present invention heat exchange system

Referring to FIGS. 15, and 17-18, in a preferred embodiment, one or more of the first, second, and third HX coils 25, 27, 29 are defined by an entrance manifold 37 that distributes fluid to the plurality of tubes 41 that are wound in a spiral manner to an exit manifold 39 that collects fluid from the plurality of tubes 41. Preferably, the tubes 41 form an array 42. The array 42 defined by a single column 43a and a plurality of rows 43b. Alternately described, the tubes 41 are wound in a spiral manner creating a plurality of layers 45 of tubes 41, namely a plurality horizontal layers 45a and a plurality of vertical layers 45b of tubes 41 wound proximate to each other. Helical coil configurations of arrays of tubes, and type heat exchangers, may also be utilized in place of spiral arrays as discussed herein.

Figure 19:
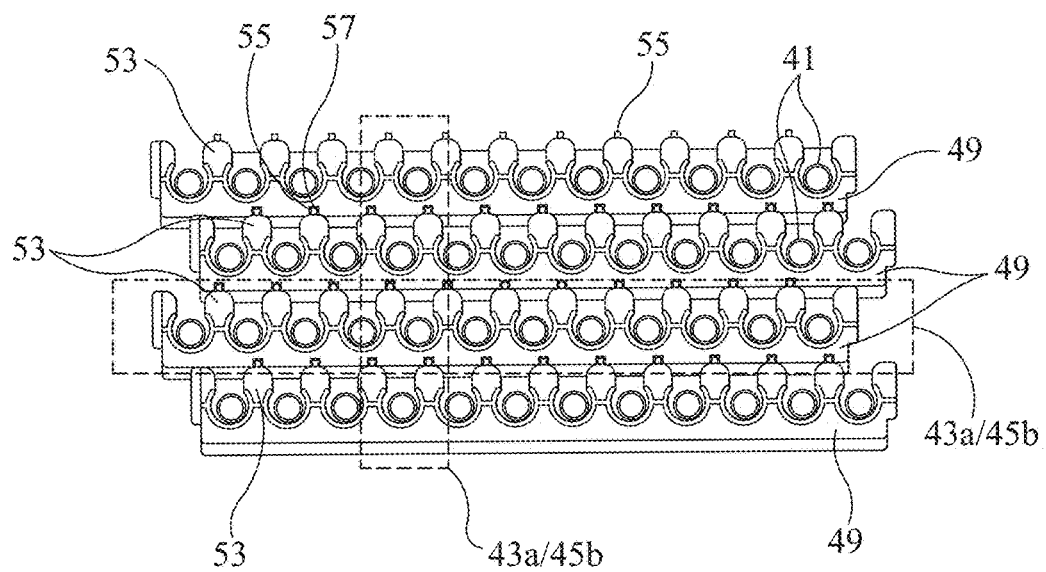
FIG. 19 is a partial cross sectional view showing tube spacers and tubes according to an embodiment of the present invention heat exchange system.

Referring to FIG. 19, a plurality of stackable tube spacers 49 are utilized to fixing a locational arrangement of the vertical layers 45b and horizontal layers 45a relative to each other. The stackable tube spacers 49 are defined by a spine 51 having a plurality of pop fit tines 53 extending from the spine 51 that are adapted to receive and hold a (horizontal) layer 45 of tubes 41. The spine 51 and/or the tines 53 have attachments (pins 55 and holes 57) for attaching to another tube spacer 49 located above and/or below the tube spacer 49 to enable an offset of one tube 41 of the array 43 from another tube 41 located above and/or below the one tube 41.

Referring again to FIGS. 15, and 17-18, according to an alternate embodiment of the present invention, a method for cooling hot fluid (water, glycol, oil or refrigerant) circulated in a heat exchange coil 19 is disclosed. The method comprises the steps of providing a heat exchange cabinet 13 as disclosed herein. A coalesced stream of spray water and air is drawn downwardly through the coil-air interface 15, over a second HX coil 27 and third HX coil 29 contained within the coil-air interface 15. After passing downwardly through the coil-air interface 15, a portion of the spray water is separated from the air by drawing the air generally horizontally inward from a face opening 209 through an intake conduit 205, to an intake transition end 211, while allowing a portion of the spray water to fall by gravity below the face opening 209 of the intake conduit 205. The air is then drawn upwardly through the plenum coil-air interface 17, over the first HX coil 25, from the intake transition end 11 to an exhaust 219 external to the enclosure 13. A hot fluid from a heat source is conveyed to the first HX coil 25, then to the second HX coil 27, then to the third HX coil 29, then back to the heat source.

The tubes 41 may be polymer type or metal, such as stainless steel or copper. Preferably, the plenum 200, base 100, walls 300 and top 400 are polymer.

The invention further includes a method for cooling fluid circulated from a heat source 10 comprises, in an enclosure or cabinet 13: drawing a coalesced stream of air and fluid spray downwardly over a heat exchange medium that surrounds a central exhaust plenum 200, the plenum 200 defined by a central exhaust wall 215 that physically separates a plenum flowpath from the heat exchange medium. The heat exchange medium may be a heat exchange coil, or slab, tubes, or tower fill located in the coil-air interface 15. After passing downwardly over the heat exchange medium, a portion of the fluid spray is separated from the air by drawing the air generally horizontally inward from a face opening through an intake conduit, to an intake transition end, while allowing a portion of the fluid spray to fall by gravity below the face opening 209 of the intake conduit 213. Air is drawn upwardly within the plenum 200 to an exhaust 203 external to the enclosure 13. The fluid is then collected in a base structure 100 and returned the fluid to the heat source 10.

Although particular embodiments of the invention have been described in detail herein with reference to the accompanying drawings, it is to be understood that the invention is not limited to those particular embodiments, and that various changes and modifications, including the omission of steps or the interchangeability of the order of steps, may be effected therein by one skilled in the art without departing from the scope or spirit of the invention.

The invention claimed is:

1. A heat exchange system for cooling heated fluid circulated from a heat source comprises:
   a vertically oriented central plenum housed within a base structure, a plurality of upright side panels, and a top, the plenum comprises:
      at least one intake conduit for drawing air into the plenum, the at least one intake conduit defined by at least one wall extending from a face opening, in a generally horizontal direction, to an intake transition end,
      an exhaust conduit for conveying the air from the at least one intake conduit, the exhaust conduit defined by at least one central exhaust wall that extends generally vertically from a central exhaust transition end to a central exhaust exit, and
      a transition defined by at least one transition wall that extends from generally horizontal at the intake transition end to generally vertical at the central exhaust transition end,
   the central plenum and the plurality of side panels define boundaries of a coil-air interface that houses a heat exchange coil, above the heat exchange coil are sprayers that spray/distribute water downwardly over the heat exchange coil into the base structure, where the water is collected and pumped back to the sprayers,
   the plurality of side panels have air intakes that communicate outside air into the coil-air interface at a location above the heat exchange coil,
   a fan connected to the plenum draws air through the air intake, downwardly over the heat exchange coil located in the coil-air interface, generally horizontally into the plenum at an intake conduit, and then vertically to the central exhaust exit of the plenum, and at least one member of a group consisting of:
   a. the plenum further having a total face area defined summing the area of the face opening of the at least one intake conduit, and also summing one or more additional areas of additional face openings, wherein the total face area for a given unit height is larger than a surface area of the exhaust conduit for the same given unit height, for minimizing a face opening air velocity, that is dependent on said total face area for a given height, to promote the deentrainment of spray water from the air entering the plenum,
   b. the plenum further including mist eliminators disposed within the at least one intake conduit of the plenum, the mist eliminators defined as a plurality of surfaces oriented to create a flowpath by which mist-entrained air travels as the mist-entrained air is drawn through the at least one intake conduit of the plenum,
   c. the plenum further including a plenum base, the plenum base having one or more drain apertures for allowing fluid to drain from the plenum to the base structure, and
   d. the plenum further including a coalescing structure located within the centrally located exhaust conduit for removing fluid that is entrained within air passing through the exhaust conduit, the coalescing structure comprising a helical strip.

2. A method for cooling hot fluid circulated in a heat exchange coil comprises the steps of:
   a. providing a heat exchange cabinet having a vertically oriented centermost plenum surrounded by the heat exchange coil and housed in a plurality of side panels, the side panels and plenum creating a coil-air interface space that contains the heat exchange coil, the coil-air interface having a coil face area defined as the area between the plenum and the plurality of side panels, the plenum comprising:
      i. at least one intake conduit for drawing air into the plenum, the at least one intake conduit defined by at least one wall extending from a face opening, in a generally horizontal direction, to an intake transition end,
      ii. an exhaust conduit for conveying the air from the at least one intake conduit, the exhaust conduit defined by at least one central exhaust wall that extends generally vertically from a central exhaust transition end to a central exhaust exit,
      iii. a transition defined by at least one transition wall that extends from generally horizontal at the intake transition end to generally vertical at the central exhaust transition end,
      iv. an exhaust plenum face area defined as the cross sectional within the exhaust conduit formed by the at least one central exhaust wall, and
      v. an intake conduit total face area defined by the sum of the area of the face opening of the at least one intake conduit and one or more additional areas of additional face openings of additional intake conduits of the plenum;
   b. drawing air with a fan coupled to the plenum:
      i. from a location outside of the cabinet, into an air intake located on an upper portion a side panel of the plurality, into the coil-air interface containing the heat exchange coil,
      ii. downwardly from the air intake over or through the heat exchange coil, iii. generally horizontally-inwardly through at least one intake conduit of the plenum from a face opening to an intake transition end, and
iv. vertically through a centrally located exhaust conduit for from a central exhaust transition end to a central exhaust exit;
c. in the heat exchange cabinet, spraying water with sprayers downwardly into the coil-air interface and on the heat exchange coil,
d. in the heat exchange cabinet, collecting water sprayed on the heat exchange coil in a base structure, and
e. returning water to the sprayers, and
f. at least one member of a group consisting of:
  i. the fan draws air through the coil-air interface at a coil velocity range between 400-800 fpm, and a ratio of coil face area to exhaust plenum face area is in the range from 2 to 1-3,5 to 1,
  ii. the intake conduit total face area is large enough to pass the air through the intake conduit total face area at a velocity of 1,500 fpm or less,
  iii. the intake conduit total face area is no less than about 43% of the coil face area,
  iv. the plenum having the ratio of exhaust plenum face area to the intake conduit total face area within the range of 1 to 2, or 40%-60%,
  v. the plenum further having a total face area defined summing the area of the face opening of the at least one intake conduit, and also summing one or more additional areas of additional face openings, wherein the total face area for a given unit height is larger than a surface area of the exhaust conduit for the same given unit height, for minimizing a face opening air velocity, that is dependent on said total face area for a given height, to promote the de-entrainment of spray water from the air entering the plenum,
  vi. the plenum further including mist eliminators disposed within the at least one intake conduit of the plenum, the mist eliminators defined as a plurality of surfaces oriented to create a flowpath by which mist-entrained air travels as the mist-entrained air is drawn through the at least one intake conduit of the plenum,
  vii. the plenum further including a plenum base, the plenum base having one or more drain apertures for allowing fluid to drain from the plenum to the base structure, and
  viii. the plenum further including a coalescing structure located within the centrally located exhaust conduit for removing fluid that is entrained within air passing through the exhaust conduit, the coalescing structure comprising a helical strip.

3. A method for cooling hot fluid circulated in a heat exchange coil comprises, in an enclosure:
a. drawing a coalesced stream of spray water and air downwardly over a heat exchange coil that surrounds a central exhaust plenum, the plenum defined by a central exhaust wall that physically separates a plenum flowpath from the heat exchange coil, and the plenum further defined as having a total face area defined by summing the area of the face opening of the at least one intake conduit, and also summing one or more additional areas of additional face openings, wherein the total face area for a given unit height is larger than a surface area of the exhaust conduit for the same given unit height, for minimizing a face opening air velocity, that is dependent on said total face area for a given height, to promote the de-entrainment of spray water from the air entering the plenum,
b. after passing downwardly through the coil, separating a portion of the spray water from the air by drawing the air generally horizontally inward from a face opening through an intake conduit, to an intake transition end, while allowing a portion of the spray water to fall by gravity below the face opening of the intake conduit,
c. drawing air upwardly within the plenum from the intake transition end to an exhaust external to the enclosure,
d. collecting the spray water in a base structure.

4. A heat exchange system for cooling heated fluid circulated from a heat source comprises:
a heat exchange cabinet defined by a vertically oriented central plenum housed within a base structure, a plurality of upright side panels, and a top,
the central plenum and the plurality of side panels define boundaries of a coil-air interface that exists within the cabinet external to the plenum,
a plenum coil-air interface is defined within the central plenum,
a first HX coil located in the plenum coil-air interface, the first HX coil adapted to convey fluid from a HX1 inlet through a plurality of tubes to a HX1 outlet,
a second HX coil located in the coil-air interface, the second HX coil adapted to convey fluid from a HX2 inlet through a plurality of tubes to a HX2 outlet,
a third HX coil located in the coil-air interface, the third HX coil located above or below the second HX coil and adapted to convey fluid from a HX3 inlet through a plurality of tubes to a HX3 outlet,
plumbing adapted to convey the heated fluid from a cabinet inlet to the first HX coil at a HX1 inlet, then from the HX1 outlet to the HX2 inlet, then from the HX2 outlet to the HX3 inlet, then from the HX3 outlet to a cabinet outlet, and
a plurality of sprayers adapted to spray water into the coil-air interface,
wherein a fan connected to the plenum causes air to be drawn from outside the cabinet downwardly with water from the sprayers through the coil-air interface over the second and third HX coils, into the plenum at an intake conduit, and then upwardly the plenum coil-air interface over the first HX coil to a central exhaust exit of the plenum at the top.

5. The heat exchange system of claim 4, one or more of the first, second, and third HX coils defined by an entrance manifold that distributes fluid to the plurality of tubes that are wound in a spiral manner to an exit manifold that collects fluid from the plurality of tubes.

6. The heat exchange system of claim 5, the tubes forming an array.

7. The heat exchange system of claim 6, the array defined by a single column and a plurality of rows.

8. The heat exchange system of claim 5, the tubes wound in a spiral manner creating a plurality of layers of tubes, namely a plurality horizontal layers and a plurality of spiral vertical layers of tubes wound proximate to each other.

9. The heat exchange system of claim 8, further including a plurality of stackable tube spacers for fixing a locational arrangement of the vertical layers and horizontal layers relative to each other,
the stackable tube spacers defined by a spine having a plurality of pop fit tines extending from the spine that are adapted to receive and hold a layer of tubes,
the spine and/or the tines having attachments for attaching to another tube spacer located above and/or below the tube spacer to enable an offset of one tube of the array from another tube located above and/or below the one tube.

10. The heat exchange system of claim 5 one or more of the first, second, and third HX coils having a second circuit defined by an entrance manifold that distributes fluid to a plurality of second circuit tubes that are wound in a spiral manner with a first circuit to an exit manifold that collects fluid from the plurality of second circuit tubes.

11. A method for cooling hot fluid comprises:
   a. providing a heat exchange cabinet defined by a vertically oriented central plenum housed within a base structure, a plurality of upright side panels, and a top, the central plenum and the plurality of side panels define boundaries of an coil-air interface that exists within the cabinet external to the plenum, and a plenum coil-air interface is defined within the central plenum,
   b. drawing a coalesced stream of spray water and air downwardly through the coil-air interface, over a second HX coil and third HX coil contained within the coil-air interface,
   c. after passing downwardly through the coil-air interface, separating a portion of the spray water from the air by drawing the air generally horizontally inward from a face opening through an intake conduit, to an intake transition end, while allowing a portion of the spray water to fall by gravity below the face opening of the intake conduit,
   d. drawing air upwardly through the plenum coil-air interface, over a first HX coil, from the intake transition end to an exhaust external to the enclosure,
   e. conveying hot fluid from a heat source to the first HX coil, then to the second HX coil, then to the third HX coil, then back to the heat source.

12. The method of claim 11, wherein the third HX coil is located above the second HX coil within the coil-air interface.

13. The method of claim 11, wherein the second HX coil is located above the third HX coil within the coil-air interface.

14. A heat exchange system for cooling heated fluid circulated from a heat source comprises:
   a vertically oriented central plenum housed within a base structure, a plurality of upright side panels, and a top; the plenum comprises:
      a. at least one intake conduit for drawing air into the plenum, the at least one intake conduit defined by at least one wall extending from a face opening, in a generally horizontal direction, to an intake transition end,
      b. an exhaust conduit for conveying the air from the at least one intake conduit, he exhaust conduit defined by at least one central exhaust wall that extends generally vertically from a central exhaust transition end to a central exhaust exit,
      c. a transition defined by at least one transition wall that extends from generally horizontal at the intake transition end to generally vertical at the central exhaust transition end,
      d. an exhaust plenum face area defined as the cross sectional within the exhaust conduit formed by the at least one central exhaust wall, and
      e. an intake conduit total face area defined by the sum of the area of the face opening of the at least one intake conduit and one or more additional areas of additional face openings of additional intake conduits of the plenum;

the central plenum and the plurality of side panels define boundaries of a coil-air interface that houses a heat exchange coil, the coil-air interface having a coil face area defined as the area between the plenum and the plurality of side panels;

above the heat exchange coil are sprayers that spray/distribute water downwardly over the heat exchange coil into the base structure, where the water is collected and pumped back to the sprayers;

the plurality of side panels have air intakes that communicate outside air into the coil-air interface at a location above the heat exchange coil; and a fan connected to the plenum draws air through the air intake, downwardly over the heat exchange coil located in the coil-air interface, generally horizontally into the plenum at an intake conduit, and then vertically to a central exhaust exit of the plenum;

wherein at least one member of a group consisting of:
   a. the fan draws air through the coil-air interface at a coil velocity range between 400-800 fpm, and a ratio of coil face area to exhaust plenum face area is in the range from 2 to 1-3.5 to 1,
   b. the intake conduit total face area is large enough to pass the air through the intake conduit total face area at a velocity of 1,500 fpm or less
   c. the intake conduit total face area is no less than about 43% of the coil face area, and
   d. the plenum having the ratio of exhaust plenum face area to the intake conduit total face area within the range of 1 to 2, or 40%-60%.

15. A plenum for a heat exchange system, the plenum comprising:
   a. at least one intake conduit for drawing air into the plenum, the at least one intake conduit defined by at least one wall extending from a face opening, in a generally horizontal direction, to an intake transition end;
   b. an exhaust conduit for conveying the air from the at least one intake conduit, the exhaust conduit defined by at least one central exhaust wall that extends generally vertically from a central exhaust transition end to a central exhaust exit;
   c. a transition defined by at least one transition wall that extends from generally horizontal at the intake transition end to generally vertical at the central exhaust transition end; and
   d. at least one member of a group consisting of:
      i. the plenum further having a total face area defined summing the area of the face opening of the at least one intake conduit, and also summing one or more additional areas of additional face openings, wherein the total face area for a given unit height is larger than a surface area of the exhaust conduit for the same given unit height, for minimizing a face opening air velocity, that is dependent on said total face area for a given height, to promote the de-entrainment of spray water from the air entering the plenum,
      ii. the plenum further including mist eliminators disposed within the at least one intake conduit of the plenum, the mist eliminators defined as a plurality of surfaces oriented to create a flowpath by which mist-entrained air travels as the mist-entrained air is drawn through the at least one intake conduit of the plenum, iii. the plenum further including a plenum base, the plenum base having one ore more drain apertures for allowing fluid to drain from the plenum to a base structure, and
iv. the plenum further including a coalescing structure located within the centrally located exhaust conduit for removing fluid that is entrained within air passing through the exhaust conduit, the coalescing structure comprising a helical strip.

16. A base structure for collection of spray water of a heat exchange system comprises:
   a. a floor existing at a first average floor elevation, and a plurality of upturned edges extending upwardly from the periphery of the floor and creating a catchment area;
   b. a raised plateau structure (RPS), extending upwardly from the floor, the RPS forming a plenum support surface, the plenum support surface existing a PSS elevation that is above the first average floor elevation, the RPS is located central to the base and occupying a RPS area less than the catchment area;
   c. a sump recess located within the catchment area, the sump recess having a SR floor existing at a sump average elevation that is lower than the first average floor elevation, the sump recess having at least one SR wall for communicating fluid from the floor to the SR floor; and
   d. a drain conduit for communicating fluid from the SR floor to a drain, and
   e. at least one of:
      i. a bleed off catchment defined by an expandable structure in fluidic communication with a waste conduit, the expandable structure disposed to intercept a portion of the spray water falling to the floor of the base structure and convey the portion to the waste conduit, or
      ii. the base structure further including fork lift fork receiving channels, said receiving channels located at a fork channel elevation below a drain recess.

17. A heat exchange system for cooling heated fluid circulated from a heat source:
   a vertically oriented central plenum housed within a base structure, a plurality of upright side panels, and a top,
   at least one side panel of the plurality comprises:
      a. an outer surface extending between side edges from a bottom outer edge to a top outer edge,
      b. an inner surface extending between side edges from a bottom inner edge to a top inner edge, and
      c. an air intake connecting the outer surface to the inner surface for communicating outside air through the side panel into a coil-air interface space, the inner surface forming a protrusion that extends inwardly to define a cavity forming face and at least one adjoining face, the cavity forming face for forming the coil-air interface space when a plurality of side panels are positioned together on a base structure, and the adjoining face for abutting (or near abutting) another adjoining face of another side panel,
   above the heat exchange coil are sprayers that spray/distribute water downwardly over the heat exchange coil into the base structure, where the water is collected and pumped back to the sprayers,
   the plurality of side panels have air intakes that communicate outside air into the coil-air interface at a location above the heat exchange coil,
   a fan connected to the plenum draws air through the air intake, downwardly over the heat exchange coil located in the coil-air interface, generally horizontally into the plenum at an intake conduit, and then vertically to a central exhaust exit of the plenum, and
   at least one of:
      i. the side panel further including one or more races, chases and/or recesses extending vertically through the protrusion for providing a pathway for piping, tubing or electrical cabling, or
      ii. the protrusion having a portional cross-sectional shape of an arc, a partial arc, and/or a semicircle.

* * * * *